United States Patent
Wang

(10) Patent No.: US 9,615,313 B2
(45) Date of Patent: Apr. 4, 2017

(54) METHOD, DEVICE, AND SYSTEM FOR SENDING AND RECEIVING MESSAGE FOR PROXIMITY SERVICE

(71) Applicant: Huawei Device Co., Ltd., Shenzhen (CN)

(72) Inventor: Jian Wang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/539,358

(22) Filed: Nov. 12, 2014

(65) Prior Publication Data
US 2015/0072698 A1    Mar. 12, 2015

Related U.S. Application Data

(63) Continuation of application No. PCT/CN2013/076102, filed on May 22, 2013.

(51) Int. Cl.
H04W 72/00 (2009.01)
H04W 48/10 (2009.01)
(Continued)

(52) U.S. Cl.
CPC ........... *H04W 48/10* (2013.01); *H04W 8/005* (2013.01); *H04W 76/023* (2013.01); *H04W 48/12* (2013.01)

(58) Field of Classification Search
CPC ..... H04W 48/10; H04W 48/12; H04W 8/005; H04W 8/08; H04W 8/085; H04W 8/14;
(Continued)

(56) References Cited

U.S. PATENT DOCUMENTS

2007/0217362 A1    9/2007    Kashima et al.
2009/0005094 A1    1/2009    Lee et al.
(Continued)

FOREIGN PATENT DOCUMENTS

CN    102638893 A    8/2012
CN    103096503 A    5/2013
(Continued)

OTHER PUBLICATIONS

Partial English Translation and Abstract of Chinese Patent Application No. CN102638893A, Nov. 25, 2014, 7 pages.
Foreign Communication From a Counterpart Application, PCT Application No. PCT/CN2013/076102, English Translation of International Search Report dated Feb. 27, 2014, 2 pages.
Foreign Communication From a Counterpart Application, PCT Application No. PCT/CN2013/076102, Written Opinion dated Feb. 27, 2014, 4 pages.
(Continued)

*Primary Examiner* — Amancio Gonzalez
(74) *Attorney, Agent, or Firm* — Conley Rose, P.C.

(57) ABSTRACT

A method, a device, and a system for sending and receiving a message for a ProSe. The method includes determining, by a base station, a device identifier list of a ProSe user equipment and a resource parameter that is used by the ProSe user equipment to send a discovery signal; and broadcasting, by the base station, a first indication message, where the first indication message indicates the device identifier list and the resource parameter, so that a first ProSe user equipment performs a ProSe with a second ProSe user equipment. According to the method and the device for sending and receiving a message for a ProSe that are provided by the embodiments, a rate that a ProSe user equipment is sensed can be improved.

6 Claims, 8 Drawing Sheets

A base station determines a device identifier list of a proximity service user equipment and a resource parameter that is used by the proximity service user equipment to send a discovery signal — 101

The base station broadcasts a first indication message, where the first indication message indicates the device identifier list and the resource parameter, so that a first proximity service user equipment receives the first indication message broadcasted by the base station and performs, according to the device identifier list and the resource parameter that are indicated by the first indication message, a service of a proximity service with a second proximity service user equipment — 102

(51) Int. Cl.
*H04W 8/00* (2009.01)
*H04W 76/02* (2009.01)
*H04W 48/12* (2009.01)

(58) Field of Classification Search
CPC ........... H04W 8/20; H04W 8/22; H04W 8/24; H04W 8/245; H04W 4/005; H04W 4/12; H04W 4/14; H04W 76/023
USPC ............ 455/404.1, 412.1, 412.2, 466, 414.4, 455/422.1, 450
See application file for complete search history.

(56) References Cited

U.S. PATENT DOCUMENTS

| | | | |
|---|---|---|---|
| 2010/0248627 A1* | 9/2010 | S. ............................ | H04W 8/18 455/41.2 |
| 2012/0011247 A1 | 1/2012 | Mallik et al. | |
| 2012/0163235 A1 | 6/2012 | Ho et al. | |
| 2012/0282922 A1* | 11/2012 | Fodor ..................... | H04W 8/22 455/426.1 |
| 2013/0029712 A1 | 1/2013 | Shao et al. | |
| 2013/0195026 A1* | 8/2013 | Johnsson .............. | H04L 5/1469 370/329 |
| 2014/0094213 A1* | 4/2014 | Khoshnevis ........ | H04W 52/383 455/522 |
| 2014/0185529 A1* | 7/2014 | Lim .................... | H04W 76/023 370/328 |
| 2014/0235248 A1 | 8/2014 | Chai et al. | |

FOREIGN PATENT DOCUMENTS

| | | | |
|---|---|---|---|
| KR | 20080113837 A | 12/2008 | |
| KR | 20100049237 A | 5/2010 | |
| WO | 2011130623 A2 | 10/2011 | |

OTHER PUBLICATIONS

Fodor, G., et al., "Design Aspects of Network Assisted Device-to-Device Communications," IEEE Communications Magazine, vol. 50, No. 3, Mar. 2012, pp. 170-177.
"Discussion on network assisted D2D discovery," 3GPP TSG RAN WG1 Meeting #73, R1-132540, May 20-24, 2013, 4 pages.
Foreign Communication From a Counterpart Application, European Application No. 13882634.2, Extended European Search Report dated Sep. 15, 2015, 13 pages.
Foreign Communication From a Counterpart Application, European Application No. 13882634.2, European Office Action dated Jul. 25, 2016, 8 pages.
Partial English Translation and Abstract of Korean Patent Application No. KR20080113837, Dec. 31, 2008, 29 pages.
Partial English Translation and Abstract of Korean Patent Application No. KR20100049237, May 12, 2010, 21 pages.
Foreign Communication From a Counterpart Application, Korean Application No. 10-2015-7030689, Korean Office Action dated Aug. 16, 2016, 6 pages.
Foreign Communication From a Counterpart Application, Korean Application No. 10-2015-7030689, English Translation of Korean Office Action dated Aug. 16, 2016, 5 pages.
Alcatel-Lucent, "General considerations for D2D Discovery," 3GPP TSG-RAN1 Meeting #73, R1-132067, May 20-24, 2013, 5 pages.
ZTE, "Solution for ProSe discovery and communication," SA WG2 Meeting #96, S2-130979, Apr. 8-12, 2013, 10 pages.
Foreign Communication From a Counterpart Application, Japanese Application No. 2016-514233, Japanese Office Action dated Dec. 13, 2016, 5 pages.
Foreign Communication From a Counterpart Application, Japanese Application No. 2016-514233, English Translation of Japanese Office Action dated Dec. 13, 2016, 6 pages.

* cited by examiner

METHOD, DEVICE, AND SYSTEM FOR SENDING AND RECEIVING MESSAGE FOR PROXIMITY SERVICE

CROSS-REFERENCE TO RELATED APPLICATIONS

This application is a continuation of International Application No. PCT/CN2013/076102, filed on May 22, 2013, which is hereby incorporated by reference in its entirety.

TECHNICAL FIELD

Embodiments of the present invention relate to communications technologies, and in particular, to a method, a device, and a system for sending and receiving a message for a Proximity Service (ProSe).

BACKGROUND

A user equipment-to-user equipment proximity service (ProSe) or Device to Device Proximity Service (D2D ProSe) technology can implement direct communication between user equipments and produce a corresponding communication service.

In an existing mobile communications system that supports the D2D ProSe technology, a user equipment that supports a ProSe needs to let, in a manner of sending a discovery signal, another user equipment sense existence of the ProSe user equipment, so that the another user equipment may establish direct communication with the ProSe user equipment according to the discovery signal.

When the mobile communications system that supports the D2D ProSe technology is applied to intra-frequency micro cells or a multi-carrier cell, because a process of establishing direct communication depends on reception of a discovery signal of a ProSe user equipment, when a certain ProSe user equipment cannot receive the discovery signal of the ProSe user equipment due to signal interference or another reason, the ProSe user equipment cannot sense the existence of the ProSe user equipment, and therefore cannot establish direct communication with the ProSe user equipment.

SUMMARY

Embodiments of the present invention provide a method, a device, and a system for sending and receiving a message for a ProSe, so as to solve a problem that a user equipment cannot establish direct communication with a ProSe user equipment when a discovery signal of the ProSe user equipment is not detected.

According to a first aspect, an embodiment of the present invention provides a method for sending a message for a ProSe, including determining, by a base station, a device identifier list of a ProSe user equipment and a resource parameter that is used by the ProSe user equipment to send a discovery signal, where a device identifier in the device identifier list and the resource parameter have a correspondence, and the ProSe user equipment includes a first ProSe user equipment and a second ProSe user equipment, or the ProSe user equipment includes a second ProSe user equipment; and broadcasting, by the base station, a first indication message, where the first indication message indicates the device identifier list and the resource parameter, so that the first ProSe user equipment receives the first indication message broadcasted by the base station and performs, according to the device identifier list and the resource parameter that are indicated by the first indication message, a ProSe with the second ProSe user equipment.

With reference to the first aspect, in a first possible implementation manner of the first aspect, the first indication message carries the device identifier list and the resource parameter.

With reference to the first aspect, in a second possible implementation manner of the first aspect, that the first indication message indicates the device identifier list and the resource parameter includes that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

With reference to the first aspect, in a third possible implementation manner of the first aspect, that the first indication message indicates the device identifier list and the resource parameter includes that the first indication message carries the device identifier list and a resource set, where the resource set is a set of resource parameters; and that a device identifier in the device identifier list and the resource parameter have a correspondence includes that a position of the device identifier in the device identifier list corresponds to a position of the resource parameter in the resource set.

With reference to the first aspect, in a fourth possible implementation manner of the first aspect, the method further includes broadcasting, by the base station, a second indication message, where the second indication message carries a resource set, and the resource set is a set of the resource parameter; that the first indication message indicates the device identifier list and the resource parameter includes that the first indication message carries the device identifier list; and that a device identifier in the device identifier list and the resource parameter have a correspondence includes that a position of the device identifier in the device identifier list corresponds to a position of the resource parameter in the resource set.

With reference to the first aspect or any one of the first to the fourth possible implementation manners of the first aspect, in a fifth possible implementation manner of the first aspect, the resource parameter is determined by any one or a combination of the following: a time-domain resource parameter; a frequency-domain resource parameter; and a code-word resource parameter.

With reference to the first aspect or any one of the first to the fifth possible implementation manner of the first aspect, in a sixth possible implementation manner of the first aspect, the method further includes determining, by the base station, a service identifier of the ProSe user equipment, where the service identifier of the ProSe user equipment and the device identifier of the ProSe user equipment have a correspondence; where the first indication message further indicates the service identifier of the ProSe user equipment.

According to a second aspect, an embodiment of the present invention provides a method for receiving a message for a ProSe, including receiving, by a first ProSe user equipment, a first indication message broadcasted by a base station, where the first indication message indicates a device identifier list of a ProSe user equipment and a resource parameter that is used by the ProSe user equipment to send a discovery signal, a device identifier in the device identifier list and the resource parameter have a correspondence, and the ProSe user equipment includes the first ProSe user equipment and a second ProSe user equipment, or the ProSe user equipment includes a second ProSe user equipment; and performing, by the first ProSe user equipment, a ProSe with the second ProSe user equipment according to the device identifier list and the resource parameter that are indicated by the first indication message.

With reference to the second aspect, in a first possible implementation manner of the second aspect, the first indication message carries the device identifier list and the resource parameter.

With reference to the second aspect, in a second possible implementation manner of the second aspect, that the first indication message indicates the device identifier list and the resource parameter includes that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

With reference to the second aspect, in a third possible implementation manner of the second aspect, that the first indication message indicates the device identifier list and the resource parameter includes that the first indication message carries the device identifier list and a resource set, where the resource set is a set of resource parameters; and that a device identifier in the device identifier list and the resource parameter have a correspondence includes that a position of the device identifier in the device identifier list corresponds to a position of the resource parameter in the resource set.

With reference to the second aspect, in a fourth possible implementation manner of the second aspect, the method further includes receiving, by the first ProSe user equipment, a second indication message broadcasted by the base station, where the second indication message carries a resource set, and the resource set is a set of the resource parameter; that the first indication message indicates the device identifier list and the resource parameter includes that the first indication message carries the device identifier list; and that a device identifier in the device identifier list and the resource parameter have a correspondence includes that a position of the device identifier in the device identifier list corresponds to a position of the resource parameter in the resource set.

With reference to the second aspect or any one of the first to the fourth possible implementation manners of the second aspect, in a fifth possible implementation manner of the second aspect, the resource parameter is determined by any one or a combination of the following: a time-domain resource parameter; a frequency-domain resource parameter; and a code-word resource parameter.

With reference to the second aspect or any one of the first to the fifth possible implementation manner of the second aspect, in a sixth possible implementation manner of the second aspect, the first indication message further indicates a service identifier of the ProSe user equipment, and the service identifier of the ProSe user equipment and the device identifier of the ProSe user equipment have a correspondence.

According to a third aspect, an embodiment of the present invention provides a method for sending a message for a ProSe, including determining, by a base station, a device identifier list of a ProSe user equipment and a service identifier of the ProSe user equipment, where a device identifier in the device identifier list and the service identifier have a correspondence, and the ProSe user equipment includes a first ProSe user equipment and a second ProSe user equipment, or the ProSe user equipment includes a second ProSe user equipment; and broadcasting, by the base station, a third indication message, where the third indication message indicates the device identifier list and the service identifier, so that the first ProSe user equipment receives the third indication message broadcasted by the base station and performs, according to the device identifier list and the service identifier that are indicated by the third indication message, a ProSe with the second ProSe user equipment.

According to a fourth aspect, an embodiment of the present invention provides a method for receiving a message for a ProSe, including receiving, by a first ProSe user equipment, a third indication message broadcasted by a base station, where the third indication message indicates a device identifier list of a ProSe user equipment and a service identifier of the ProSe user equipment, a device identifier in the device identifier list and the service identifier have a correspondence, and the ProSe user equipment includes the first ProSe user equipment and a second ProSe user equipment, or the ProSe user equipment includes a second ProSe user equipment; and performing, by the first ProSe user equipment, a ProSe with the second ProSe user equipment according to the device identifier list and the service identifier that are indicated by the third indication message.

According to a fifth aspect, an embodiment of the present invention provides a base station, including a first determining module, configured to determine a device identifier list of a ProSe user equipment and a resource parameter that is used by the ProSe user equipment to send a discovery signal, where a device identifier in the device identifier list and the resource parameter have a correspondence, and the ProSe user equipment includes a first ProSe user equipment and a second ProSe user equipment, or the ProSe user equipment includes a second ProSe user equipment; and a first broadcasting module, configured to broadcast a first indication message, where the first indication message indicates the device identifier list and the resource parameter, so that the first ProSe user equipment receives the first indication message broadcasted by the base station and performs, according to the device identifier list and the resource parameter that are indicated by the first indication message, a ProSe with the second ProSe user equipment.

With reference to the fifth aspect, in a first possible implementation manner of the fifth aspect, the first indication message carries the device identifier list and the resource parameter.

With reference to the fifth aspect, in a second possible implementation manner of the fifth aspect, that the first indication message indicates the device identifier list and the resource parameter includes that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

With reference to the fifth aspect, in a third possible implementation manner of the fifth aspect, that the first indication message indicates the device identifier list and the resource parameter includes that the first indication message carries the device identifier list and a resource set, where the resource set is a set of resource parameters; and that a device identifier in the device identifier list and the resource parameter have a correspondence includes that a position of the device identifier in the device identifier list corresponds to a position of the resource parameter in the resource set.

With reference to the fifth aspect, in a fourth possible implementation manner of the fifth aspect, the base station further includes a second broadcasting module, configured to broadcast a second indication message, where the second indication message carries a resource set, and the resource set is a set of the resource parameter; that the first indication message indicates the device identifier list and the resource parameter includes that the first indication message carries the device identifier list; and that a device identifier in the device identifier list and the resource parameter have a correspondence includes that a position of the device identifier in the device identifier list corresponds to a position of the resource parameter in the resource set.

With reference to the fifth aspect or any one of the first to the fourth possible implementation manners of the fifth aspect, in a fifth possible implementation manner of the fifth aspect, the resource parameter is determined by any one or a combination of the following: a time-domain resource parameter; a frequency-domain resource parameter; and a code-word resource parameter.

With reference to the fifth aspect or any one of the first to the fifth possible implementation manner of the fifth aspect, in a sixth possible implementation manner of the fifth aspect, the base station further includes a second determining module, configured to determine a service identifier of the ProSe user equipment, where the service identifier of the ProSe user equipment and the device identifier of the ProSe user equipment have a correspondence; and the first indication message further indicates the service identifier of the ProSe user equipment.

According to a sixth aspect, an embodiment of the present invention provides a first ProSe user equipment, including a first receiving module, configured to receive a first indication message broadcasted by a base station, where the first indication message indicates a device identifier list of a ProSe user equipment and a resource parameter that is used by the ProSe user equipment to send a discovery signal, a device identifier in the device identifier list and the resource parameter have a correspondence, and the ProSe user equipment includes the first ProSe user equipment and a second ProSe user equipment, or the ProSe user equipment includes a second ProSe user equipment; and a first service-performing module, configured to perform a ProSe with the second ProSe user equipment according to the device identifier list and the resource parameter that are indicated by the first indication message.

With reference to the sixth aspect, in a first possible implementation manner of the sixth aspect, the first indication message carries the device identifier list and the resource parameter.

With reference to the sixth aspect, in a second possible implementation manner of the sixth aspect, that the first indication message indicates the device identifier list and the resource parameter includes that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

With reference to the sixth aspect, in a third possible implementation manner of the sixth aspect, that the first indication message indicates the device identifier list and the resource parameter includes that the first indication message carries the device identifier list and a resource set, where the resource set is a set of resource parameters; and that a device identifier in the device identifier list and the resource parameter have a correspondence includes that a position of the device identifier in the device identifier list corresponds to a position of the resource parameter in the resource set.

With reference to the sixth aspect, in a fourth possible implementation manner of the sixth aspect, the first ProSe user equipment further includes a second receiving module, configured to receive a second indication message broadcasted by the base station, where the second indication message carries a resource set, and the resource set is a set of the resource parameter; that the first indication message indicates the device identifier list and the resource parameter includes that the first indication message carries the device identifier list; and that a device identifier in the device identifier list and the resource parameter have a correspondence includes that a position of the device identifier in the device identifier list corresponds to a position of the resource parameter in the resource set.

With reference to the sixth aspect or any one of the first to the fourth possible implementation manners of the sixth aspect, in a fifth possible implementation manner of the sixth aspect, the resource parameter is determined by any one or a combination of the following: a time-domain resource parameter; a frequency-domain resource parameter; and a code-word resource parameter.

With reference to the sixth aspect or any one of the first to the fifth possible implementation manner of the sixth aspect, in a sixth possible implementation manner of the sixth aspect, the first indication message further indicates a service identifier of the ProSe user equipment, and the service identifier of the ProSe user equipment and the device identifier of the ProSe user equipment have a correspondence.

According to a seventh aspect, an embodiment of the present invention provides a base station, including a third determining module, configured to determine a device identifier list of a ProSe user equipment and a service identifier of the ProSe user equipment, where a device identifier in the device identifier list and the service identifier have a correspondence, and the ProSe user equipment includes a first ProSe user equipment and a second ProSe user equipment, or the ProSe user equipment includes a second ProSe user equipment; and a third broadcasting module, configured to broadcast a third indication message, where the third indication message indicates the device identifier list and the service identifier, so that the first ProSe user equipment receives the third indication message broadcasted by the base station and performs, according to the device identifier list and the service identifier that are indicated by the third indication message, a ProSe with the second ProSe user equipment.

According to an eighth aspect, an embodiment of the present invention provides a first ProSe user equipment, including a third receiving module, configured to receive a third indication message broadcasted by a base station, where the third indication message indicates a device identifier list of a ProSe user equipment and a service identifier of the ProSe user equipment, a device identifier in the device identifier list and the service identifier have a correspondence, and the ProSe user equipment includes the first ProSe user equipment and a second ProSe user equipment, or the ProSe user equipment includes a second ProSe user equipment; and a second service-performing module, configured to perform a ProSe with the second ProSe user equipment according to the device identifier list and the service identifier that are indicated by the third indication message.

According to a ninth aspect, an embodiment of the present invention provides a base station, including a sender and a processor, where the processor is configured to determine a device identifier list of a ProSe user equipment and a resource parameter that is used by the ProSe user equipment to send a discovery signal, where a device identifier in the device identifier list and the resource parameter have a correspondence, and the ProSe user equipment includes a first ProSe user equipment and a second ProSe user equipment, or the ProSe user equipment includes a second ProSe user equipment; the processor is further configured to generate a first indication message, where the first indication message indicates the device identifier list and the resource parameter; and the sender is configured to broadcast the first indication message, so that the first ProSe user equipment receives the first indication message broadcasted by the base station and performs, according to the device identifier list and the resource parameter that are indicated by the first indication message, a ProSe with the second ProSe user equipment.

With reference to the ninth aspect, in a first possible implementation manner of the ninth aspect, the first indication message carries the device identifier list and the resource parameter.

With reference to the ninth aspect, in a second possible implementation manner of the ninth aspect, that the first indication message indicates the device identifier list and the resource parameter includes that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

With reference to the ninth aspect, in a third possible implementation manner of the ninth aspect, that the first indication message indicates the device identifier list and the resource parameter includes that the first indication message carries the device identifier list and a resource set, where the resource set is a set of resource parameters; and that a device identifier in the device identifier list and the resource parameter have a correspondence includes that a position of the device identifier in the device identifier list corresponds to a position of the resource parameter in the resource set.

With reference to the ninth aspect, in a fourth possible implementation manner of the ninth aspect, the sender is further configured to broadcast a second indication message, where the second indication message carries a resource set, and the resource set is a set of the resource parameter; that the first indication message indicates the device identifier list and the resource parameter includes that the first indication message carries the device identifier list; and that a device identifier in the device identifier list and the resource parameter have a correspondence includes that a position of the device identifier in the device identifier list corresponds to a position of the resource parameter in the resource set.

With reference to the ninth aspect or any one of the first to the fourth possible implementation manners of the ninth aspect, in a fifth possible implementation manner of the ninth aspect, the resource parameter is determined by any one or a combination of the following: a time-domain resource parameter; a frequency-domain resource parameter; and a code-word resource parameter.

With reference to the ninth aspect or any one of the first to the fifth possible implementation manner of the ninth aspect, in a sixth possible implementation manner of the ninth aspect, the processor is further configured to determine a service identifier of the ProSe user equipment, where the service identifier of the ProSe user equipment and the device identifier of the ProSe user equipment have a correspondence; where the first indication message further indicates the service identifier of the ProSe user equipment.

According to a tenth aspect, an embodiment of the present invention provides a first ProSe user equipment, including a receiver and a processor, where the receiver is configured to receive a first indication message broadcasted by a base station, where the first indication message indicates a device identifier list of a ProSe user equipment and a resource parameter that is used by the ProSe user equipment to send a discovery signal, a device identifier in the device identifier list and the resource parameter have a correspondence, and the ProSe user equipment includes the first ProSe user equipment and a second ProSe user equipment, or the ProSe user equipment includes a second ProSe user equipment; and the processor is configured to perform a ProSe with the second ProSe user equipment according to the device identifier list and the resource parameter that are indicated by the first indication message.

With reference to the tenth aspect, in a first possible implementation manner of the tenth aspect, the first indication message carries the device identifier list and the resource parameter.

With reference to the tenth aspect, in a second possible implementation manner of the tenth aspect, that the first indication message indicates the device identifier list and the resource parameter includes that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

With reference to the tenth aspect, in a third possible implementation manner of the tenth aspect, that the first indication message indicates the device identifier list and the resource parameter includes that the first indication message carries the device identifier list and a resource set, where the resource set is a set of resource parameters; and that a device identifier in the device identifier list and the resource parameter have a correspondence includes that a position of the device identifier in the device identifier list corresponds to a position of the resource parameter in the resource set.

With reference to the tenth aspect, in a fourth possible implementation manner of the tenth aspect, the receiver is further configured to receive a second indication message broadcasted by the base station, where the second indication message carries a resource set, and the resource set is a set of the resource parameter; that the first indication message indicates the device identifier list and the resource parameter includes that the first indication message carries the device identifier list; and that a device identifier in the device identifier list and the resource parameter have a correspondence includes that a position of the device identifier in the device identifier list corresponds to a position of the resource parameter in the resource set.

With reference to the tenth aspect or any one of the first to the fourth possible implementation manners of the tenth aspect, in a fifth possible implementation manner of the tenth aspect, the resource parameter is determined by any one or a combination of the following: a time-domain resource parameter; a frequency-domain resource parameter; and a code-word resource parameter.

With reference to the tenth aspect or any one of the first to the fifth possible implementation manner of the tenth aspect, in a sixth possible implementation manner of the tenth aspect, the first indication message further indicates a service identifier of the ProSe user equipment, and the service identifier of the ProSe user equipment and the device identifier of the ProSe user equipment have a correspondence.

According to an eleventh aspect, an embodiment of the present invention provides a base station, including a sender and a processor, where the processor is configured to determine a device identifier list of a ProSe user equipment and a service identifier of the ProSe user equipment, where a device identifier in the device identifier list and the service identifier have a correspondence, and the ProSe user equipment includes a first ProSe user equipment and a second ProSe user equipment, or the ProSe user equipment includes a second ProSe user equipment; the processor is further configured to generate a third indication message, where the third indication message indicates the device identifier list and the service identifier; and the sender is configured to broadcast the third indication message, so that the first ProSe user equipment receives the first indication message broadcasted by the base station and performs, according to the device identifier list and the service identifier that are indicated by the third indication message, a ProSe with the second ProSe user equipment.

According to a twelfth aspect, an embodiment of the present invention provides a first ProSe user equipment, including a receiver and a processor, where the receiver is configured to receive a third indication message broadcasted by a base station, where the third indication message indicates a device identifier list of a ProSe user equipment and a service identifier of the ProSe user equipment, a device identifier in the device identifier list and the service identifier have a correspondence, and the ProSe user equipment includes the first ProSe user equipment and a second ProSe user equipment, or the ProSe user equipment includes a second ProSe user equipment; and the processor is configured to perform a ProSe with the second ProSe user equipment according to the device identifier list and the service identifier that are indicated by the third indication message.

According to a thirteenth aspect, an embodiment of the present invention provides a system for sending and receiving a message for a ProSe, including the base station of the fifth aspect or any one of the first to the sixth possible implementation manners of the fifth aspect, and the first ProSe user equipment of the sixth aspect or any one of the first to the sixth possible implementation manners of the sixth aspect.

According to a fourteenth aspect, an embodiment of the present invention provides a system for sending and receiving a message for a ProSe, including the possible implementation manner of the base station according to the seventh aspect and the possible implementation manner of the first ProSe user equipment according to the eighth aspect.

According to the method, device, and system for sending and receiving a message for a ProSe that are provided by the embodiments of the present invention, a base station determines a device identifier list of a ProSe user equipment and a resource parameter that is used by the ProSe user equipment to send a discovery signal, and broadcasts a first indication message, where the first indication message indicates the device identifier list and the resource parameter, and a device identifier in the device identifier list and the resource parameter have a correspondence, so that a first ProSe user equipment can not only sense existence of a second ProSe user equipment, but also learn a resource parameter that is used by the second ProSe user equipment to send a discovery signal, so as to obtain a discovery signal sent by the second ProSe user equipment on a resource corresponding to another resource parameter, and then perform a ProSe with the second ProSe user equipment. The device identifier list and the corresponding resource parameter are broadcasted so that the first proximity service user equipment that needs to perform a ProSe can find the second ProSe user equipment conveniently and quickly, without listening, in a large range, to a discovery signal sent by the second ProSe user equipment, thereby simplifying a procedure of a ProSe and efficiently reducing power consumption of the first ProSe user equipment.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
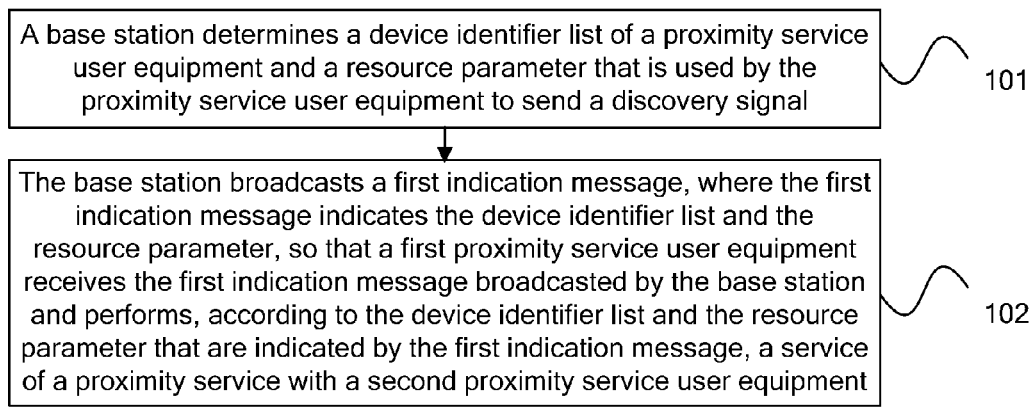
FIG. 1 is a schematic flowchart of a method for sending a message for a ProSe according to a first embodiment of the present invention.

FIG. 1 is a schematic flowchart of a method for sending a message for a ProSe according to a first embodiment of the present invention. The method for sending a message for a ProSe that is provided by this embodiment may be performed by an apparatus that is configured to perform a method for sending a message for a ProSe, where the apparatus may be implemented by software and/or hardware, and the apparatus may be any base station. The method for sending a message for a ProSe that is provided by this embodiment includes the following steps.

Step 101: A base station determines a device identifier list of a ProSe user equipment and a resource parameter that is used by the ProSe user equipment to send a discovery signal.

A device identifier in the device identifier list and the resource parameter have a correspondence; the ProSe user equipment includes a first ProSe user equipment and a second ProSe user equipment, or the ProSe user equipment includes a second ProSe user equipment.

Step 102: The base station broadcasts a first indication message, where the first indication message indicates the device identifier list and the resource parameter, so that the first ProSe user equipment receives the first indication message broadcasted by the base station and performs, according to the device identifier list and the resource parameter that are indicated by the first indication message, a ProSe with the second ProSe user equipment.

In a specific implementation process, when the method provided by this embodiment is applied to an intra-frequency micro cell, and when a mobile communications system supporting a D2D ProSe technology is applied to the intra-frequency micro cell, because multiple micro cells exist within a range covered by a macro cell, power for a user equipment to send a discovery signal cannot be excessively high; otherwise, interference to the micro cells is caused. Therefore, transmit power for the user equipment to send the discovery signal is limited. When the transmit power for the user equipment to send the discovery signal is low, another user equipment cannot sense existence of the user equipment. In the method provided by this embodiment, the ProSe user equipment may sense existence of another user equipment using the device identifier of the another user equipment.

The method provided by this embodiment may further be applied to a multi-carrier cell. When a mobile communications system supporting a D2D ProSe technology is applied to a multi-carrier cell, because the cell supports a plurality of carriers, each carrier may allow a ProSe user equipment to send and receive a discovery signal. However, for one specific ProSe user equipment, when the ProSe user equipment has a limited capability and is a low-level ProSe user equipment, the ProSe user equipment can send a discovery signal or receive a discovery signal only on one carrier. Therefore, it is possible that the ProSe user equipment cannot detect a discovery signal that is sent by another device and on another carrier, and therefore cannot sense existence of the another user equipment. In the method provided by this embodiment, the ProSe user equipment can obtain a discovery signal that is sent by another ProSe user equipment and on another carrier, and then perform a ProSe with the another ProSe user equipment. Persons skilled in the art may understand that a carrier is merely used as an example herein. In a specific implementation process, it is possible that the ProSe user equipment cannot detect a discovery signal that is sent by another user equipment and on another time-domain symbol or code-word resource, that is, a discovery signal that is sent by another user equipment on a resource corresponding to another resource parameter.

Persons skilled in the art may understand that the foregoing application scenario is merely an exemplary application scenario. In a specific application process, the method for sending a message for a ProSe that is provided by this embodiment may be applied to any communications system and to any cell served by a base station, as long as a user equipment in the cell supports a ProSe.

Specially, a ProSe user equipment is a user equipment that supports a ProSe technology. The ProSe user equipment can not only register with a ProSe server of a network that the ProSe user equipment supports a ProSe capability, so that the ProSe server manages the ProSe user equipment, but also identify another ProSe user equipment that exists around, and perform a ProSe with the another ProSe user equipment by a series of processes such as call initiating, channel measurement, channel feedback, resource scheduling, data transmission, and call completion.

In step 101, the determining, by the base station, the device identifier list of the ProSe user equipment and the resource parameter that is used by the ProSe user equipment to send the discovery signal is implemented mainly by management performed by a ProSe server on the ProSe user equipment. In a specific implementation process, the ProSe user equipment first registers with a ProSe server of a network that the ProSe user equipment supports a ProSe capability (which may include a device identifier, a serving base station, and a service identifier of a ProSe). Therefore, the ProSe server can not only learn a device identifier of a ProSe user equipment within a network coverage range, but also learn which base stations serve the ProSe user equipment, obtain a cell identifier (Cell ID) of a serving base station and a ProSe that is supported by the ProSe user equipment. Optionally, the ProSe server may maintain, in a form of a ProSe table, the foregoing information. Fields of the ProSe table may be a device identifier (ProSe UE ID), a Cell ID, a service identifier 1 (Service ID #1), a service identifier 2 (Service ID #2), and the like.

The ProSe server may further determine a resource parameter that is used by the ProSe user equipment to send a discovery signal, where the resource parameter may be determined by any one or a combination of a time-domain resource parameter, a frequency-domain resource parameter, and a code-word resource parameter. It can be known from the forgoing that the ProSe server has a storage capability and a capability for managing and controlling a ProSe user equipment.

In a specific application process, the ProSe server may be borne by a base station, or be borne by another network device. When the ProSe server is borne by a base station, the base station may directly determine a device identifier list of the ProSe user equipment and a resource parameter that is used by the ProSe user equipment to send a discovery signal. When the ProSe server is borne by another network device, the network device performs signaling interaction with a base station, so that the base station may determine the device identifier list of the ProSe user equipment and the resource parameter that is used by the ProSe user equipment to send a discovery signal.

The device identifier list may include one device identifier, and may also include a plurality of device identifiers. The embodiment sets no special limit to the number of device identifiers in the device identifier list. Moreover, the device identifier in the device identifier list and the resource parameter have a correspondence. That is, the ProSe user equipment to which the device identifier belongs uses a resource parameter corresponding to the device identifier of the ProSe user equipment to send a discovery signal.

In step 102, the base station broadcasts the first indication message, where the first indication message indicates the device identifier list and the resource parameter.

Each ProSe user equipment may receive the first indication message in a listening manner. The embodiment is described in detail using an example where one ProSe user equipment listens and receives the first indication message. For ease of description, the one ProSe user equipment is referred to as a first ProSe user equipment, and another ProSe user equipment that performs a ProSe with the first ProSe user equipment is referred to as a second ProSe user equipment. Persons skilled in the art may understand that the first ProSe user equipment may be a ProSe user equipment that has registered with a ProSe server that the ProSe user equipment supports a ProSe capability, or may be a ProSe user equipment that does not register with the ProSe server that the ProSe user equipment supports a ProSe capability. That is, the ProSe user equipment includes the first ProSe user equipment and the second ProSe user equipment, or the ProSe user equipment includes the second ProSe user equipment.

After obtaining the first indication message, the first ProSe user equipment may sense existence of the second ProSe user equipment according to the device identifier list indicated by the first indication message; may learn, according to the resource parameter in the first indication message, a resource parameter that is used by the second ProSe user equipment to send a discovery signal; and may directly perform detection according to the resource parameter to obtain a sending signal, so as to perform a ProSe with the second ProSe user equipment.

According to the method for sending a message for a ProSe that is provided by this embodiment of the present invention, a base station determines a device identifier list of a ProSe user equipment and a resource parameter that is used by the ProSe user equipment to send a discovery signal, and broadcasts a first indication message, where the first indication message indicates the device identifier list and the resource parameter, and a device identifier in the device identifier list and the resource parameter have a correspondence, so that a first ProSe user equipment can not only sense existence of a second ProSe user equipment, but also learn a resource parameter that is used by the second ProSe user equipment to send a discovery signal, so as to obtain a discovery signal sent by the second ProSe user equipment on a resource corresponding to another resource parameter, and then perform a ProSe with the second ProSe user equipment. The device identifier list and the corresponding resource parameter are broadcasted so that the first ProSe user equipment that needs to perform a ProSe can find the second ProSe user equipment conveniently and quickly, without listening, in a large range, to a discovery signal sent by the second ProSe user equipment, thereby simplifying a procedure of a ProSe and efficiently reducing power consumption of the first ProSe user equipment.

Figure 2:
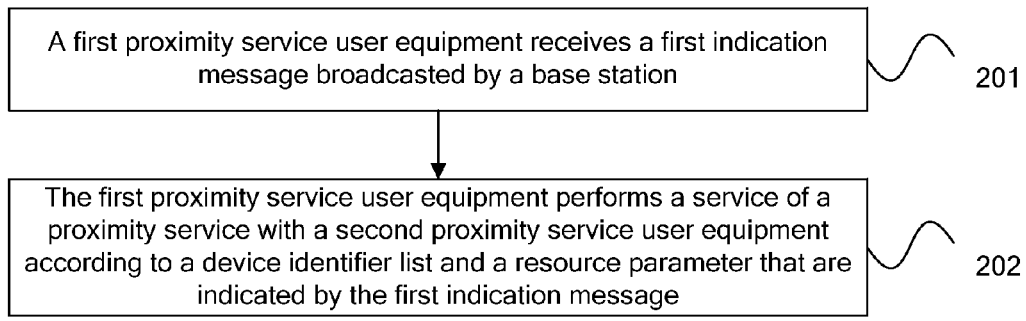
FIG. 2 is a schematic flowchart of a method for receiving a message for a ProSe according to a first embodiment of the present invention.

FIG. 2 is a schematic flowchart of a method for receiving a message for a ProSe according to a first embodiment of the present invention. The method for receiving a message for a ProSe that is provided by this embodiment may be performed by an apparatus that is configured to perform a method for receiving a message for a ProSe, where the apparatus may be implemented by software and/or hardware, and the apparatus may be any ProSe user equipment, and is referred to as a first ProSe user equipment in this embodiment for convenience of description. The method for receiving a message for a ProSe that is provided by this embodiment includes the following steps:

Step 201: A first ProSe user equipment receives a first indication message broadcasted by a base station.

The first indication message indicates a device identifier list of a ProSe user equipment and a resource parameter that is used by the ProSe user equipment to send a discovery signal, where a device identifier in the device identifier list and the resource parameter have a correspondence, and the ProSe user equipment includes the first ProSe user equipment and a second ProSe user equipment, or the ProSe user equipment includes a second ProSe user equipment.

Step 202: The first ProSe user equipment performs a ProSe with the second ProSe user equipment according to the device identifier list and the resource parameter that are indicated by the first indication message.

An application scenario of this embodiment is similar to that of the embodiment shown in FIG. 1, and details are not repeatedly described in this embodiment.

In step 201, the first ProSe user equipment may receive the first indication message broadcasted by the base station in a listening manner.

In step 202, the first ProSe user equipment may learn existence of the second ProSe user equipment according to the device identifier list, so as to actively send a discovery signal to the second ProSe user equipment. The first ProSe user equipment may further learn a resource parameter that is used by the second ProSe user equipment to send a discovery signal, where a device identifier in the device identifier list and the resource parameter have a correspondence. The first ProSe user equipment can not only sense existence of the second ProSe user equipment, but also learn the resource parameter that is used by the second ProSe user equipment to send a discovery signal, so as to obtain a discovery signal that is sent by the second ProSe user equipment on a resource corresponding to another resource parameter, and then perform a ProSe with the second ProSe user equipment.

According to the method for receiving a message for a ProSe provided by this embodiment, by receiving a first indication message broadcasted by a base station, a first ProSe user equipment can not only sense existence of a second ProSe user equipment according to a device identifier list indicated by the first indication message, but also determine, according to a resource parameter, a resource that is used by the second ProSe user equipment to send a discovery signal. The device identifier list and the corresponding resource parameter are broadcasted, so that the first ProSe user equipment that needs to perform a ProSe can find the second ProSe user equipment conveniently and quickly, without listening, in a large range, to a discovery signal sent by the second ProSe user equipment, thereby simplifying a procedure of a ProSe and efficiently reducing power consumption of the first ProSe user equipment.

The following, with reference to specific embodiments, describes in detail a possible implementation manner in which the first indication message indicates the device identifier list and the resource parameter in the embodiments shown in FIG. 1 and FIG. 2.

One possible implementation manner is that the first indication message carries the device identifier list and the resource parameter.

In a specific implementation process, a base station broadcasts a first indication message, where the first indication message carries a device identifier list and the resource parameter that are associated, where a device identifier in the device identifier list is associated with the resource parameter. Using three ProSe user equipments as an example, device identifiers of the three ProSe user equipments in a device identifier list are a, b, and c respectively. A resource parameter that is corresponding to the device identifier a and used by a ProSe user equipment to send a discovery signal is x; a resource parameter that is corresponding to the device identifier b and used by a ProSe user equipment to send a discovery signal is y, and a resource parameter that is corresponding to the device identifier c and used by a ProSe user equipment to send a discovery signal is z; then, a first indication message carries a device identifier list {a, b, c} and a resource parameter {x, y, z}, or a first indication message carries {a, x}, {b, y}, and {c, z}. A first ProSe user equipment listens the first indication message broadcasted by a base station, and detects the device identifiers and the resource parameters used by the ProSe user equipments to send the discovery signals. For example, the first ProSe user equipment detects {a, x}, {b, y}, and {c, z}; the first ProSe user equipment determines that the ProSe user equipments with the device identifiers a, b, and c, exist around, which use the resource parameters {x}, {y}, and {z} respectively to send a discovery signal. Persons skilled in the art may understand that a, b, and c as well as x, y, and z in this embodiment are merely used for simple description; in a specific implementation process, the device identifier in the device identifier list and the resource parameter may exist in another form.

A first indication message in this embodiment carries a device identifier list and a resource parameter, so that a first ProSe user equipment determines existence of a second ProSe user equipment after receiving the first indication message, and may further learn a resource parameter that is used by the second ProSe user equipment to send a discovery signal, so as to obtain a discovery signal sent by the second ProSe user equipment on a resource corresponding to another resource parameter, and then perform a ProSe with the second ProSe user equipment.

Another possible implementation manner is that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

A specific implementation process includes two cases. In one case, a first indication message carries only a device identifier list. Using a first preset function relationship that is a default on a base station and a first ProSe user equipment, a device identifier in the device identifier list may be mapped to a resource parameter using the first preset function relationship. For example, when a device identifier is an International Mobile Subscriber Identification Number (IMSI), the IMSI is mapped to a resource parameter, such as a time-domain symbol or a carrier sequence, using the first preset function relationship, so that the first ProSe user equipment may obtain the resource parameter. Therefore, the first indication message sent by the base station to the first ProSe user equipment does not need to carry the resource parameter, which saves a resource overhead of a communications system.

Correspondingly, in another case, a first indication message carries only a resource parameter, which is mapped to a device identifier in a device identifier list using a second preset function relationship that is a default on a base station and a first ProSe user equipment. That is, the first ProSe user equipment obtains the resource parameter in the device identifier list using the resource parameter. Persons skilled in the art may understand that the first preset function relationship and the second preset function relationship may be the same or different. When the two are different, optionally, the second preset function relationship may be an inverse function of the first preset function relationship. Therefore, the first indication message sent by the base station to the first ProSe user equipment does not need to carry the device identifier list, which saves a resource overhead of a communications system.

Still another possible implementation manner is that the first indication message carries the device identifier list and a resource set, where the resource set is a set of resource parameters, and a position of the device identifier in the device identifier list corresponds to a position of the resource parameter in the resource set.

In a specific implementation process, a first indication message carries a device identifier list and a resource set, where the resource set is a set of resource parameters. The resource set includes a resource used by a ProSe user equipment to send a discovery signal. A first ProSe user equipment parses the resource set in the first indication message after receiving the first indication message to obtain the resource used to send the discovery signal and a resource parameter corresponding to the resource. Specially, a position of the device identifier in the device identifier list corresponds to a position of the resource parameter in the resource set. That is, the position of the device identifier corresponds to a position, in the resource set, of the resource corresponding to the resource parameter. This correspondence is a default on a base station and the first ProSe user equipment and does not need to be carried in the first indication message, which saves a resource overhead of a communications system.

Yet another possible implementation manner is that the base station broadcasts a second indication message, and the first ProSe user equipment receives the second indication message broadcasted by the base station, where the second indication message carries a resource set, and the resource set is a set of the resource parameter; the first indication message carries the device identifier list, and the resource set is a set of resource parameters; and a position of the device identifier in the device identifier list corresponds to a position of the resource parameter in the resource set.

In a specific implementation process, a base station may further broadcast a second indication message, and a first ProSe user equipment receives the second indication message broadcasted by the base station, where the second indication message carries a resource set. A meaning of the resource set in this embodiment is the same as a meaning of the resource set in the foregoing embodiment, and details are not repeatedly described in this embodiment. In this case, a first indication message carries only a device identifier list but carries no resource set. Persons skilled in the art may understand that in this embodiment, there is no strict time sequence relationship for the base station to broadcast the first indication message and the second indication message. When receiving the first indication message first, the first ProSe user equipment may determine existence of a second ProSe user equipment according to the first indication message. When receiving the second indication message first, the first ProSe user equipment first parses the resource set to obtain the resource parameter. When the first ProSe user equipment receives both the first indication message and the second indication message, because a position of the device identifier in the device identifier list corresponds to a position of the resource parameter in the resource set, the first ProSe user equipment may learn a specific resource parameter corresponding to the device identifier, so as to obtain a discovery signal sent by the second ProSe user equipment on a resource corresponding to another resource parameter, and then perform a ProSe with the second ProSe user equipment. Specially, this correspondence is a default on the base station and the first ProSe user equipment and does not need to be carried in the first indication message or the second indication message, which saves a resource overhead of a communications system.

The following describes in detail that the position of the device identifier in the device identifier list corresponds to the position of the resource parameter in the resource set as described in the foregoing embodiment.

In a specific implementation process, a base station broadcasts, using a first indication message or a second indication message, a resource corresponding to a resource parameter that is used by a ProSe service user equipment to send a discovery signal, where the resource may be a part of time resources, a part of frequency resources, or some code-word resources, and may also be a combination of the foregoing resources, for example, a frequency resource in a part of time resource; then, divides the resource into groups, where each group may bear one discovery signal of a ProSe service user equipment; and numbers each group, for example, a resource is divided into four groups numbered {1, 2, 3, 4} respectively.

The base station broadcasts a device identifier list using a first indication message. In this case, a sequence of device identifiers in the device identifier list corresponds to serial numbers of the resource groups. For example, a sequence of device identifiers is {a, b, c, d}. Because a position of a device identifier in the device identifier list corresponds to a position of a resource parameter in a resource set, it is implied that resource parameters corresponding to the device identifiers {a, b, c, d} are {1, 2, 3, 4}. That is, a corresponds to 1, b corresponds to 2, c corresponds to 3, and d corresponds to 4.

Figure 3:
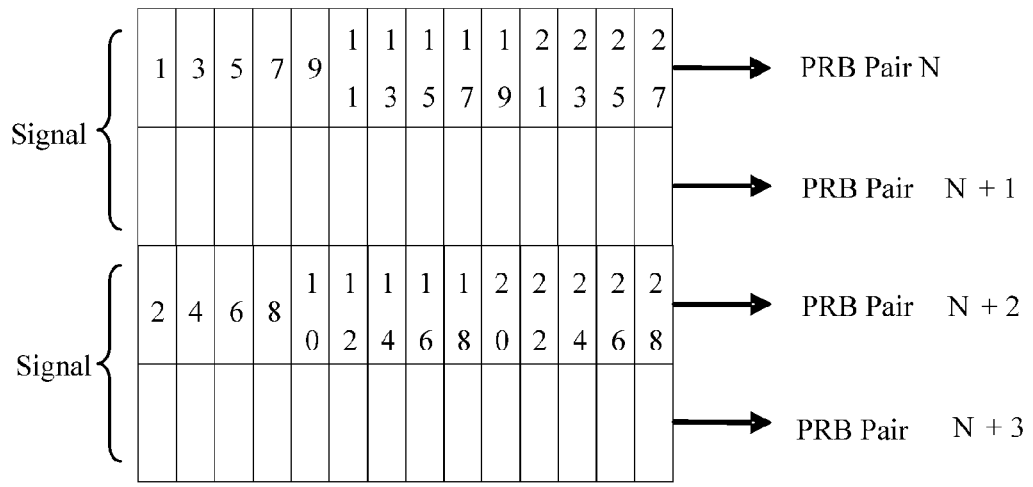
FIG. 3 is a schematic diagram of a resource set according to an embodiment of the present invention.
Figure 4:
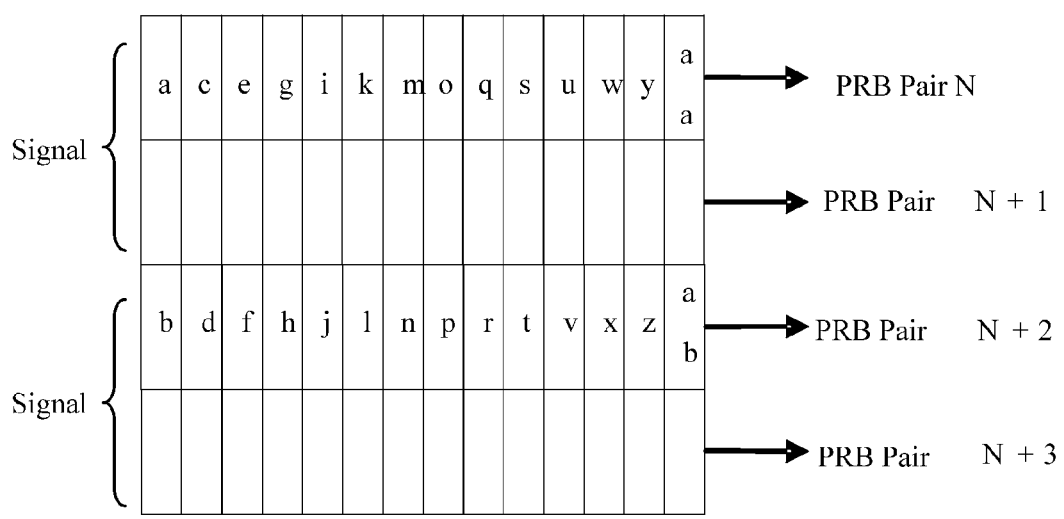
FIG. 4 is a schematic diagram of a device identifier list according to an embodiment of the present invention.

A more detailed example is shown in FIG. 3 and FIG. 4, where FIG. 3 is a schematic diagram of a resource set according to an embodiment of the present invention, and FIG. 4 is a schematic diagram of a device identifier list according to an embodiment of the present invention. In FIG. 3, a resource with a total of four physical resource block pairs (PRB) is used to send a discovery signal (Signal), including 14 time-domain symbols and 48 sub-carriers. The PRB Pair includes a PRB Pair N, a PRB Pair N+1, a PRB Pair N+2, and a PRB Pair N+3. Each discovery signal occupies 24 sub-carriers of one time-domain symbol. Therefore, resource parameters corresponding to the resource set broadcasted by the base station using the first indication message or a second indication message may be used to send 28 discovery signals. Corresponding resource parameters are {1, 2, 3, 4, 5, 6, 7, 8, 9, 10, 11, 12, 13, 14, 15, 16, 17, 18, 19, 20, 21, 22, 23, 24, 25, 26, 27, 28}. When the base station broadcasts the device identifier list using the first indication message where a sorting sequence of device identifiers in the device identifier list is {a, b, c, d, e, f, g, h, i, j, k, l, m, n, o, p, q, r, s, t, u, v, w, x, y, z, aa, ab}, FIG. 4 shows that a position of a device identifier in the device identifier list corresponds to a position of the resource parameter in the resource set. Persons skilled in the art may understand that in the embodiment shown in FIG. 3 and FIG. 4, the position of the device identifier in the device identifier list and the position of the resource parameter have a correspondence according to a sequence. In a specific application process, the position correspondence between the device identifier in the device identifier list and the resource parameter used to send a discovery signal may be implemented in another predefined manner. For example, the device identifiers may be sorted in descending order first, and then correspond to the position of the resource parameter according to a sorted sequence. Specially, the resource set is shown in a form of a rectangle in this embodiment; however, in a specific implementation process, the resource set may further be shown using a cycle, which is not specially limited herein by this embodiment.

Further, on the basis of the embodiments described above, the method for sending a message for a ProSe further includes determining, by the base station, a service identifier of the ProSe user equipment, where the service identifier of the ProSe user equipment and the device identifier of the ProSe user equipment have a correspondence; and the first indication message further indicates the service identifier of the ProSe user equipment.

Correspondingly, the method for receiving a message for a ProSe further includes the service identifier of the ProSe user equipment and the device identifier of the ProSe user equipment have a correspondence, where the first indication message further indicates the service identifier of the ProSe user equipment.

Persons skilled in the art may understand that a manner in which the first indication message indicates the service identifier of the ProSe user equipment is similar to a manner in which the first indication message indicates the device identifier and the resource parameter, which may be a manner that the first indication message directly carries a service identifier of a service supported by a user equipment, and may also be a manner of mapping using a preset function to map a device identifier to a service identifier, or the like. The following uses an example where the first indication message carries the service identifier of the user equipment for detailed description.

A first indication message carries a device identifier list, a resource parameter, and a service identifier. Using three ProSe user equipments as an example, device identifiers of the three ProSe user equipments in a device identifier list are a, b, and c respectively. A resource parameter that is corresponding to the device identifier a and used by a ProSe user equipment to send a discovery signal is x, a resource parameter that is corresponding to the device identifier b and used by a ProSe user equipment to send a discovery signal is y, and a resource parameter that is corresponding to the device identifier c and used by a ProSe user equipment to send a discovery signal is z. A service identifier of the device identifier a is o, a service identifier of the device identifier b is p, and a service identifier of the device identifier c is q. Then, the first indication message carries {a, b, c}, {x, y, z}, and {o, p, q}, or the first indication message carries {a, x, o}, {x, y, p}, and {c, z, q}. A first ProSe user equipment receives the first indication message broadcasted by the base station, so as to obtain a device identifier of each ProSe user equipment and a resource parameter and service identifier corresponding to the device identifier. For example, the first ProSe user equipment obtains {a, x, o}, {b, y, p}, and {c, z, q}; the first ProSe user equipment determines that the ProSe user equipments with the device identifiers a, b, and c, exist around, which use the resource parameters {x}, {y}, and {z} respectively to send a discovery signal and support a service {o}, {p}, and {q} respectively.

In this embodiment, the base station also sends, when sending the device identifier, the resource parameter that is used by the first ProSe user equipment to send a discovery signal, so that the first ProSe user equipment determines existence of a second ProSe user equipment, and may further learn a resource parameter that is used by the second ProSe user equipment to send a discovery signal, so as to obtain a discovery signal sent by the second ProSe user equipment on a resource corresponding to another resource parameter, then perform a ProSe, and obtain a service identifier of the second ProSe user equipment. This may prevent the first ProSe user equipment from querying, using a subsequent query process, a service provided by a ProSe user equipment, which omits a subsequent process of data transmission and saves usage of a system resource.

Figure 5:
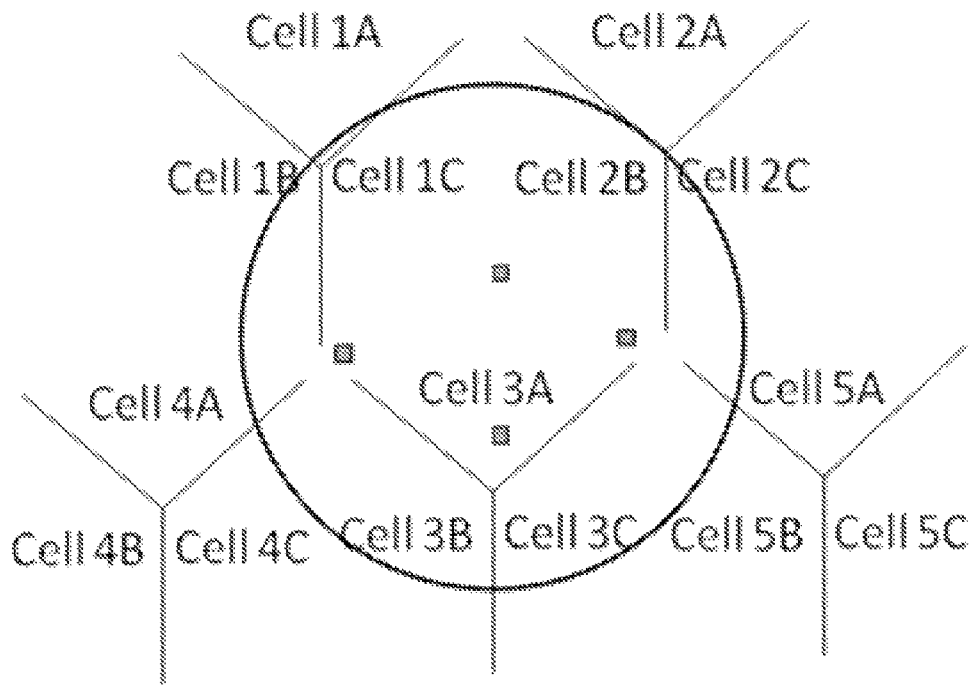
FIG. 5 is a schematic diagram of broadcasting, by a base station, an indication message according to an embodiment of the present invention.

On the basis of the embodiments described above, the base station may further selectively broadcast the first indication message or the second indication message. FIG. 5 is a schematic diagram of broadcasting, by a base station, an indication message according to an embodiment of the present invention. As shown in FIG. 5, there are five base stations in total, which are a base station 1 to a base station 5 respectively. Each base station has three cells, which are a cell A, a cell B, and a cell C respectively. Using a cell A of the base station 3 as an example, there are four first ProSe user equipments at different positions (four rectangles) in the cell. For the left first ProSe user equipment, a ProSe user equipment which neighbors the left first ProSe user equipment and can perform a ProSe may be in a cell 3A, a cell 1C, a cell 1B, a cell 4A, a cell 4C, or a cell 3B; for the right first ProSe user equipment, a ProSe user equipment which neighbors the right first ProSe user equipment and can perform a ProSe may be in a cell 3A, a Cell 2B, a cell 2C, a cell 5A, a cell 5B, or a cell 3C; for the lower first ProSe user equipment, a ProSe user equipment which neighbors the lower first ProSe user equipment and can perform a ProSe may be in a cell 3A, a Cell 3B, or a cell 3C; and for the upper first ProSe user equipment, a ProSe user equipment which neighbors the upper first ProSe user equipment and can perform a ProSe may be in a cell 3A, a Cell 2B, or a cell 1C.

Therefore, the base station may selectively broadcast a device identifier list, a resource parameter, and the like of a ProSe user equipment according to a cell where the first ProSe user equipment is located. For example, when a first ProSe user equipment is located in the cell 3A of the base station 3, content broadcasted by a base station may be a device identifier list of a ProSe user equipment in the Cell 3A; a device identifier list of a ProSe user equipment in the Cell 3A, the Cell 1C, or the Cell 2B; or a device identifier list of a ProSe user equipment in the Cell 3A, the Cell 1C, the Cell 2B, the Cell 1B, the Cell 4A, the Cell 4C, the Cell 3B, the Cell 3C, the Cell 5B, the Cell 5A, or the Cell 2C.

In this embodiment, the broadcasted device identifier list includes all device identifiers in a cell.

Specially, a base station may further selectively broadcast a device identifier list, a resource parameter, and the like of a ProSe user equipment according to a service that can be provided by the ProSe user equipment. For example, content broadcasted by a base station may be a device identifier list of a ProSe user equipment that supports a specific service (which is differentiated according to a service identifier) in the Cell 3A; a device identifier list of a ProSe user equipment that supports a specific service (which is differentiated according to a service identifier) in the Cell 3A, the Cell 1C, or the Cell 2B; or a device identifier list of a ProSe user equipment that supports a specific service (which is differentiated according to a service identifier) in the Cell 3A, the Cell 1C, the Cell 2B, the Cell 1B, the Cell 4A, the Cell 4C, the Cell 3B, the Cell 3C, the Cell 5B, the Cell 5A, or the Cell 2C.

In this embodiment, the broadcasted device identifier list includes only a device identifier that supports a specific service in a cell.

In this embodiment, a device identifier list or a resource parameter is broadcasted selectively, which can save a resource of a communications system and improve communication efficiency.

Figure 6:
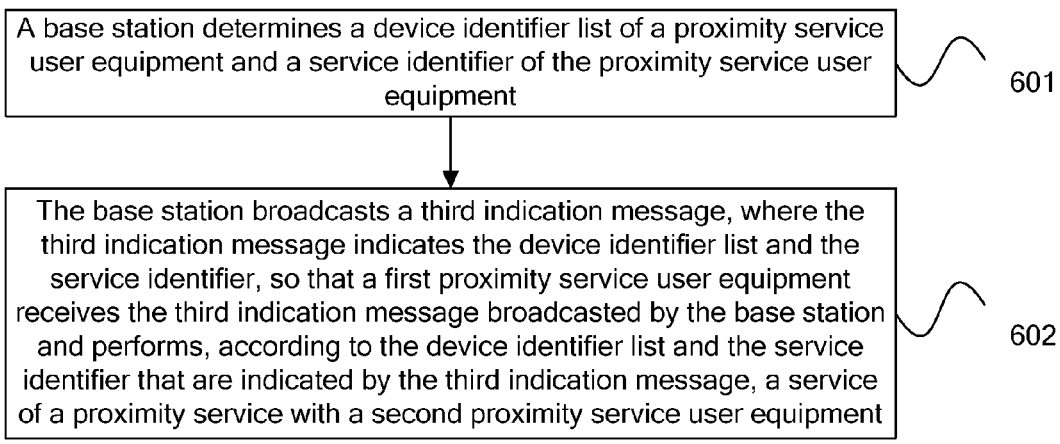
FIG. 6 is a schematic flowchart of a method for sending a message for a ProSe according to a second embodiment of the present invention.

FIG. 6 is a schematic flowchart of a method for sending a message for a ProSe according to a second embodiment of the present invention. The method for sending a message for a ProSe that is provided by this embodiment may be performed by an apparatus that is configured to perform a method for sending a message for a ProSe, where the apparatus may be implemented by software and/or hardware, and the apparatus may be any base station. The method for sending a message for a ProSe that is provided by this embodiment includes the following steps:

Step 601: A base station determines a device identifier list of a ProSe user equipment and a service identifier of the ProSe user equipment.

A device identifier in the device identifier list and the service identifier have a correspondence; the ProSe user equipment includes a first ProSe user equipment and a second ProSe user equipment, or the ProSe user equipment includes a second ProSe user equipment.

Step 602: The base station broadcasts a third indication message, where the third indication message indicates the device identifier list and the service identifier, so that the first ProSe user equipment receives the third indication message broadcasted by the base station and performs, according to the device identifier list and the service identifier that are indicated by the third indication message, a ProSe with the second ProSe user equipment.

An application scenario of this embodiment is similar to that of the embodiment shown in FIG. 1, and details are not repeatedly described in this embodiment. In this embodiment, a manner in which the base station determines the device identifier list of the ProSe user equipment and the service identifier of the ProSe user equipment in step 601 is similar to a manner in which the base station determines the device identifier list of the ProSe user equipment and the resource parameter that is used by the ProSe user equipment to send a discovery signal in step 101, which is not described repeatedly in this embodiment.

In step 602, the base station broadcasts the third indication message, where the third indication message indicates the device identifier list and the service identifier. Persons skilled in the art may understand that in the embodiment, a manner in which the third indication message indicates the device identifier and the service identifier is similar to a manner in which the first indication message indicates the service identifier and the resource parameter, and details are not repeatedly described in this embodiment.

According to this embodiment, a base station determines a device identifier list of a ProSe user equipment and a service identifier of the ProSe user equipment; and the base station broadcasts a third indication message, where the third indication message indicates the device identifier list and the service identifier, so that a first ProSe user equipment may sense existence of a second ProSe user equipment, and the first ProSe user equipment may obtain the service identifier, which omits a subsequent process of data transmission, and saves usage of a system resource.

Figure 7:
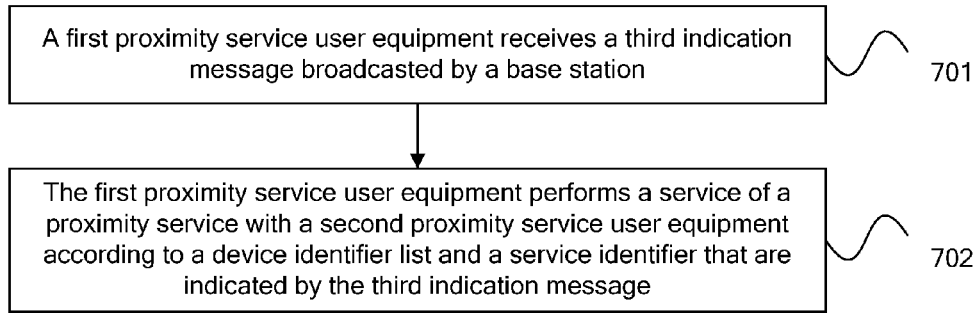
FIG. 7 is a schematic flowchart of a method for receiving a message for a ProSe according to a second embodiment of the present invention.

FIG. 7 is a schematic flowchart of a method for receiving a message for a ProSe according to a second embodiment of the present invention. The method for receiving a message for a ProSe that is provided by this embodiment may be performed by an apparatus that is configured to perform a method for receiving a message for a ProSe, where the apparatus may be implemented by software and/or hardware, and the apparatus may be any ProSe user equipment, and is referred to as a first ProSe user equipment in this embodiment for convenience of description. The method for receiving a message for a ProSe that is provided by this embodiment includes the following steps.

Step 701: A first ProSe user equipment receives a third indication message broadcasted by a base station.

The third indication message indicates a device identifier list of a ProSe user equipment and a service identifier of the ProSe user equipment, where a device identifier in the device identifier list and the service identifier have a correspondence, and the ProSe user equipment includes a first ProSe user equipment and a second ProSe user equipment, or the ProSe user equipment includes a second ProSe user equipment.

Step 702: The first ProSe user equipment performs a ProSe with the second ProSe user equipment according to the device identifier list and the service identifier that are indicated by the third indication message.

An application scenario of this embodiment is similar to that of the embodiment shown in FIG. 1, and details are not repeatedly described in this embodiment.

In step 701, the first ProSe user equipment may receive the third indication message broadcasted by the base station in a listening manner.

In step 702, the first ProSe user equipment may learn existence of the second ProSe user equipment according to the device identifier list, so as to actively send a discovery signal to the second ProSe user equipment. The first ProSe user equipment may further learn a service identifier of a service supported by the second ProSe user equipment, so as to perform a ProSe with the second ProSe user equipment.

According to the method for receiving a message for a ProSe provided by this embodiment, by receiving a third indication message broadcasted by a base station, a first ProSe user equipment can not only sense existence of a second ProSe user equipment according to a device identifier list indicated by the third indication message, but also perform a ProSe according to a service identifier of the second ProSe user equipment, which omits a subsequent process of data transmission, and saves a resource of a communications system.

Figure 8:
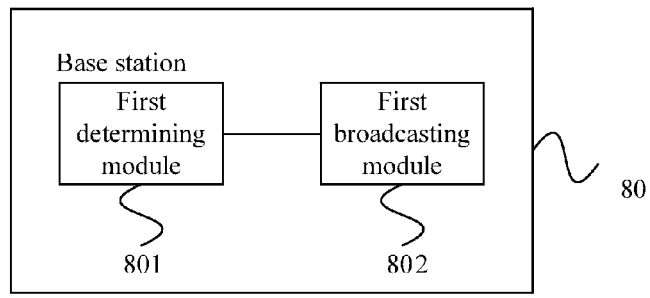
FIG. 8 is a schematic structural diagram of a base station according to a first embodiment of the present invention.

FIG. 8 is a schematic structural diagram of a base station according to a first embodiment of the present invention. As shown in FIG. 8, a base station 80 provided by this embodiment includes a first determining module 801 and a first broadcasting module 802.

The first determining module 801 is configured to determine a device identifier list of a ProSe user equipment and a resource parameter that is used by the ProSe user equipment to send a discovery signal, where a device identifier in the device identifier list and the resource parameter have a correspondence, and the ProSe user equipment includes a first ProSe user equipment and a second ProSe user equipment, or the ProSe user equipment includes a second ProSe user equipment.

The first broadcasting module 802 is configured to broadcast a first indication message, where the first indication message indicates the device identifier list and the resource parameter, so that the first ProSe user equipment receives the first indication message broadcasted by the base station and performs, according to the device identifier list and the resource parameter that are indicated by the first indication message, a ProSe with the second ProSe user equipment.

The base station according to this embodiment may be used to implement a technical solution of the method embodiment shown in FIG. 1; the implementation principle and technical effects thereof are similar and are not repeatedly described herein.

Figure 9:
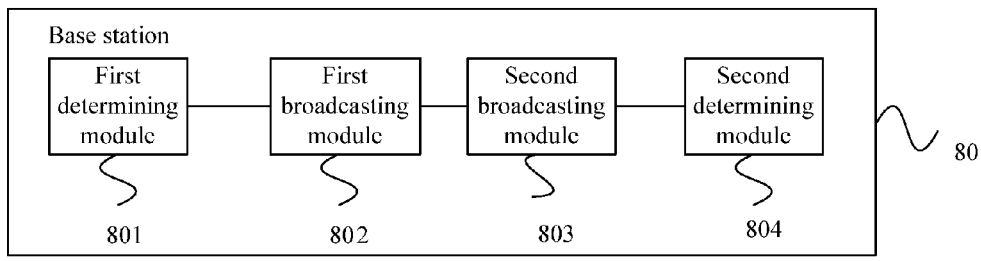
FIG. 9 is a schematic structural diagram of a base station according to a second embodiment of the present invention.

FIG. 9 is a schematic structural diagram of a base station according to a second embodiment of the present invention. The embodiment is implemented on the basis of the embodiment shown in FIG. 8, and is as follows:

Optionally, the first indication message carries the device identifier list and the resource parameter.

Optionally, that the first indication message indicates the device identifier list and the resource parameter includes that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

Optionally, that the first indication message indicates the device identifier list and the resource parameter includes that the first indication message carries the device identifier list and a resource set, where the resource set is a set of resource parameters; and that a device identifier in the device identifier list and the resource parameter have a correspondence includes that a position of the device identifier in the device identifier list corresponds to a position of the resource parameter in the resource set.

Optionally, the base station further includes a second broadcasting module 803, configured to broadcast a second indication message, where the second indication message carries a resource set, and the resource set is a set of the resource parameter; that the first indication message indicates the device identifier list and the resource parameter includes that the first indication message carries the device identifier list; and that a device identifier in the device identifier list and the resource parameter have a correspondence includes that a position of the device identifier in the device identifier list corresponds to a position of the resource parameter in the resource set.

Optionally, the resource parameter is determined by any one or a combination of the following: a time-domain resource parameter; a frequency-domain resource parameter; and a code-word resource parameter.

Optionally, the base station further includes a second determining module 804, configured to determine a service identifier of the ProSe user equipment, where the service identifier of the ProSe user equipment and the device identifier of the ProSe user equipment have a correspondence; and the first indication message further indicates the service identifier of the ProSe user equipment.

The base station according to this embodiment may be used to implement a technical solution of the foregoing method embodiments; the implementation principle and technical effects thereof are similar and are not repeatedly described herein.

Figure 10:
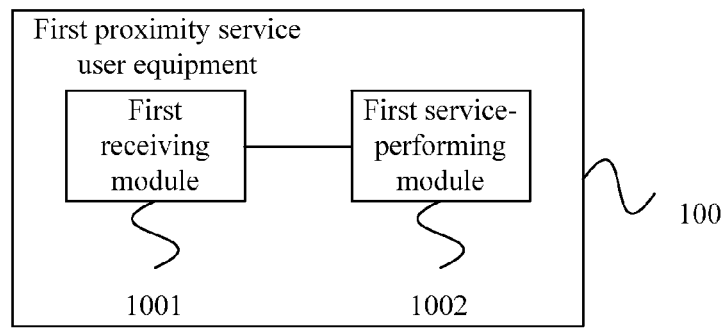
FIG. 10 is a schematic structural diagram of a first ProSe user equipment according to a first embodiment of the present invention.

FIG. 10 is a schematic diagram of a first ProSe user equipment according to a first embodiment of the present invention. As shown in FIG. 10, a first ProSe user equipment 100 provided by this embodiment includes a first receiving module 1001 and a first service-performing module 1002.

The first receiving module 1001 is configured to receive a first indication message broadcasted by a base station, where the first indication message indicates a device identifier list of a ProSe user equipment and a resource parameter that is used by the ProSe user equipment to send a discovery signal, a device identifier in the device identifier list and the resource parameter have a correspondence, and the ProSe user equipment includes the first ProSe user equipment and a second ProSe user equipment, or the ProSe user equipment includes a second ProSe user equipment.

The first service-performing module 1002 is configured to perform a ProSe with the second ProSe user equipment according to the device identifier list and the resource parameter that are indicated by the first indication message.

The first ProSe user equipment according to this embodiment may be used to implement a technical solution of the method embodiment shown in FIG. 2; the implementation principle and technical effects thereof are similar and are not repeatedly described herein.

Figure 11:
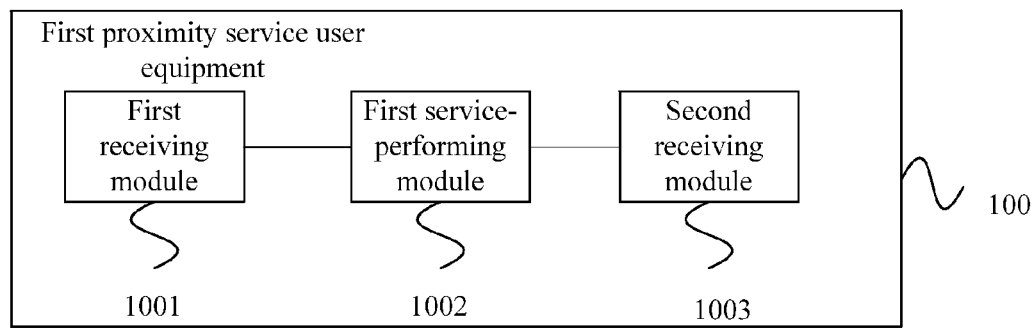
FIG. 11 is a schematic structural diagram of a first ProSe user equipment according to a second embodiment of the present invention.

FIG. 11 is a schematic structural diagram of a first ProSe user equipment according to a second embodiment of the present invention. The embodiment is implemented on the basis of the embodiment shown in FIG. 10, and is as follows:

Optionally, the first indication message carries the device identifier list and the resource parameter.

Optionally, that the first indication message indicates the device identifier list and the resource parameter includes that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

Optionally, that the first indication message indicates the device identifier list and the resource parameter includes that the first indication message carries the device identifier list and a resource set, where the resource set is a set of resource parameters; and that a device identifier in the device identifier list and the resource parameter have a correspondence includes that a position of the device identifier in the device identifier list corresponds to a position of the resource parameter in the resource set.

Optionally, the first ProSe user equipment further includes a second receiving module 1003, configured to receive a second indication message broadcasted by the base station, where the second indication message carries a resource set, and the resource set is a set of the resource parameter; that the first indication message indicates the device identifier list and the resource parameter includes that the first indication message carries the device identifier list; and that a device identifier in the device identifier list and the resource parameter have a correspondence includes that a position of the device identifier in the device identifier list corresponds to a position of the resource parameter in the resource set.

Optionally, the resource parameter is determined by any one or a combination of the following: a time-domain resource parameter; a frequency-domain resource parameter; and a code-word resource parameter.

Optionally, the first indication message further indicates a service identifier of the ProSe user equipment, and the service identifier of the ProSe user equipment and the device identifier of the ProSe user equipment have a correspondence.

The first ProSe user equipment according to this embodiment may be used to implement a technical solution of the foregoing method embodiments; the implementation principle and technical effects thereof are similar and are not repeatedly described herein.

Figure 12:
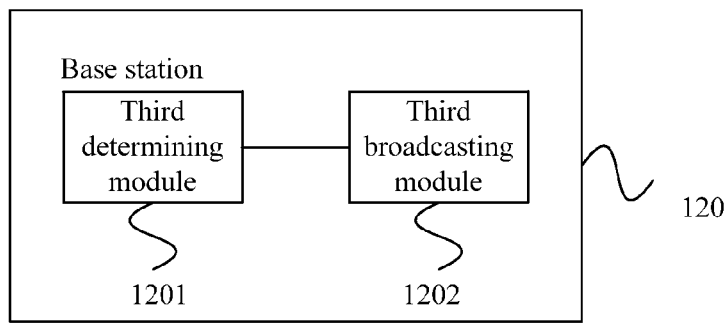
FIG. 12 is a schematic structural diagram of a base station according to a third embodiment of the present invention.

FIG. 12 is a schematic structural diagram of a base station according to a third embodiment of the present invention. As shown in FIG. 12, a base station 120 provided by this embodiment includes a third determining module 1201 and a third broadcasting module 1202.

The third determining module 1201 is configured to determine a device identifier list of a ProSe user equipment and a service identifier of the ProSe user equipment, where a device identifier in the device identifier list and the service identifier have a correspondence, and the ProSe user equipment includes a first ProSe user equipment and a second ProSe user equipment, or the ProSe user equipment includes a second ProSe user equipment.

The third broadcasting module 1202 is configured to broadcast a third indication message, where the third indication message indicates the device identifier list and the service identifier, so that the first ProSe user equipment receives the third indication message broadcasted by the base station and performs, according to the device identifier list and the service identifier that are indicated by the third indication message, a ProSe with the second ProSe user equipment.

The base station according to this embodiment may be used to implement a technical solution of the method embodiment shown in FIG. 6; the implementation principle and technical effects thereof are similar and are not repeatedly described herein.

Figure 13:
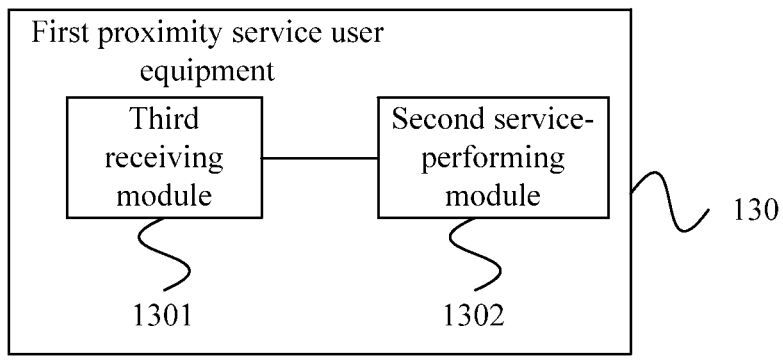
FIG. 13 is a schematic structural diagram of a first ProSe user equipment according to a third embodiment of the present invention.

FIG. 13 is a schematic structural diagram of a first ProSe user equipment according to a third embodiment of the present invention. As shown in FIG. 13, a first ProSe user equipment 130 provided by this embodiment includes a third receiving module 1301 and a second service-performing module 1302, where the third receiving module 1301 is configured to receive a third indication message broadcasted by a base station, where the third indication message indicates a device identifier list of a ProSe user equipment and a service identifier of the ProSe user equipment, a device identifier in the device identifier list and the service identifier have a correspondence, and the ProSe user equipment includes the first ProSe user equipment and a second ProSe user equipment, or the ProSe user equipment includes a second ProSe user equipment; and the second service-performing module 1302 is configured to perform a ProSe with the second ProSe user equipment according to the device identifier list and the service identifier that are indicated by the third indication message.

The first ProSe user equipment according to this embodiment may be used to implement a technical solution of the method embodiment shown in FIG. 7; the implementation principle and technical effects thereof are similar and are not repeatedly described herein.

Figure 14:
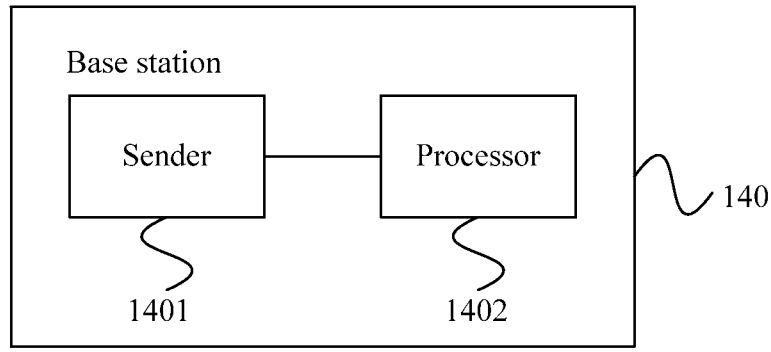
FIG. 14 is a schematic structural diagram of a base station according to a fourth embodiment of the present invention.

FIG. 14 is a schematic structural diagram of a base station according to a fourth embodiment of the present invention. As shown in FIG. 14, a base station 140 provided by this embodiment includes a sender 1401 and a processor 1402.

The processor 1402 is configured to determine a device identifier list of a ProSe user equipment and a resource parameter that is used by the ProSe user equipment to send a discovery signal, where a device identifier in the device identifier list and the resource parameter have a correspondence, and the ProSe user equipment includes a first ProSe user equipment and a second ProSe user equipment, or the ProSe user equipment includes a second ProSe user equipment.

The processor 1402 is further configured to generate a first indication message, where the first indication message indicates the device identifier list and the resource parameter.

The sender 1401 is configured to broadcast the first indication message, so that the first ProSe user equipment receives the first indication message broadcasted by the base station and performs, according to the device identifier list and the resource parameter that are indicated by the first indication message, a ProSe with the second ProSe user equipment.

Optionally, the first indication message carries the device identifier list and the resource parameter.

Optionally, that the first indication message indicates the device identifier list and the resource parameter includes that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

Optionally, that the first indication message indicates the device identifier list and the resource parameter includes that the first indication message carries the device identifier list and a resource set, where the resource set is a set of resource parameters; and that a device identifier in the device identifier list and the resource parameter have a correspondence includes that a position of the device identifier in the device identifier list corresponds to a position of the resource parameter in the resource set.

Optionally, the sender 1401 is further configured to broadcast a second indication message, where the second indication message carries a resource set, and the resource set is a set of the resource parameter; that the first indication message indicates the device identifier list and the resource parameter includes that the first indication message carries the device identifier list; and that a device identifier in the device identifier list and the resource parameter have a correspondence includes that a position of the device identifier in the device identifier list corresponds to a position of the resource parameter in the resource set.

Optionally, the resource parameter is determined by any one or a combination of the following: a time-domain resource parameter; a frequency-domain resource parameter; and a code-word resource parameter.

Optionally, the processor 1402 is further configured to determine a service identifier of the ProSe user equipment, where the service identifier of the ProSe user equipment and the device identifier of the ProSe user equipment have a correspondence; and the first indication message further indicates the service identifier of the ProSe user equipment.

The base station according to this embodiment may be used to implement a technical solution of the foregoing method embodiments; the implementation principle and technical effects thereof are similar and are not repeatedly described herein.

Figure 15:
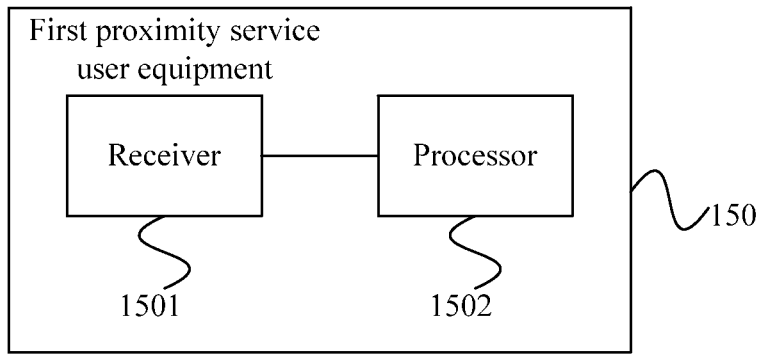
FIG. 15 is a schematic structural diagram of a first ProSe user equipment according to a fourth embodiment of the present invention.

FIG. 15 is a schematic diagram of a first ProSe user equipment according to a fourth embodiment of the present invention. As shown in FIG. 15, a first ProSe user equipment 150 provided by this embodiment includes a receiver 1501 and a processor 1502.

The receiver 1501 is configured to receive a first indication message broadcasted by a base station, where the first indication message indicates a device identifier list of a ProSe user equipment and a resource parameter that is used by the ProSe user equipment to send a discovery signal, a device identifier in the device identifier list and the resource parameter have a correspondence, and the ProSe user equipment includes the first ProSe user equipment and a second ProSe user equipment, or the ProSe user equipment includes a second ProSe user equipment.

The processor 1502 is configured to perform a ProSe with the second ProSe user equipment according to the device identifier list and the resource parameter that are indicated by the first indication message.

Optionally, the first indication message carries the device identifier list and the resource parameter.

Optionally, that the first indication message indicates the device identifier list and the resource parameter includes that the first indication message carries the device identifier list, and the device identifier in the device identifier list is mapped to the resource parameter using a first preset function relationship; or the first indication message carries the resource parameter, and the resource parameter is mapped to the device identifier in the device identifier list using a second preset function relationship.

Optionally, that the first indication message indicates the device identifier list and the resource parameter includes that the first indication message carries the device identifier list and a resource set, where the resource set is a set of resource parameters; and that a device identifier in the device identifier list and the resource parameter have a correspondence includes that a position of the device identifier in the device identifier list corresponds to a position of the resource parameter in the resource set.

Optionally, the receiver 1501 is further configured to receive a second indication message broadcasted by the base station, where the second indication message carries a resource set, and the resource set is a set of the resource parameter; that the first indication message indicates the device identifier list and the resource parameter includes that the first indication message carries the device identifier list; and that a device identifier in the device identifier list and the resource parameter have a correspondence includes that a position of the device identifier in the device identifier list corresponds to a position of the resource parameter in the resource set.

Optionally, the resource parameter is determined by any one or a combination of the following: a time-domain resource parameter; a frequency-domain resource parameter; and a code-word resource parameter.

Optionally, the first indication message further indicates a service identifier of the ProSe user equipment, and the service identifier of the ProSe user equipment and the device identifier of the ProSe user equipment have a correspondence.

The first ProSe user equipment according to this embodiment may be used to implement a technical solution of the foregoing method embodiments; the implementation principle and technical effects thereof are similar and are not repeatedly described herein.

Figure 16:
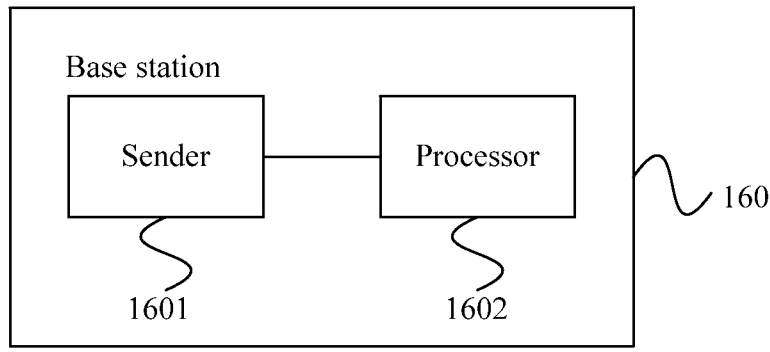
FIG. 16 is a schematic structural diagram of a base station according to a fifth embodiment of the present invention.

FIG. 16 is a schematic structural diagram of a base station according to a fifth embodiment of the present invention. As shown in FIG. 16, a base station 160 provided by this embodiment includes a sender 1601 and a processor 1602.

The processor 1602 is configured to determine a device identifier list of a ProSe user equipment and a service identifier of the ProSe user equipment, where a device identifier in the device identifier list and the service identifier have a correspondence, and the ProSe user equipment includes a first ProSe user equipment and a second ProSe user equipment, or the ProSe user equipment includes a second ProSe user equipment.

The processor 1602 is further configured to generate a third indication message, where the third indication message indicates the device identifier list and the service identifier.

The sender 1601 is configured to broadcast the third indication message, so that the first ProSe user equipment receives the first indication message broadcasted by the base station and performs, according to the device identifier list and the service identifier that are indicated by the third indication message, a ProSe with the second ProSe user equipment.

The base station according to this embodiment may be used to implement a technical solution of the foregoing method embodiments; the implementation principle and technical effects thereof are similar and are not repeatedly described herein.

Figure 17:
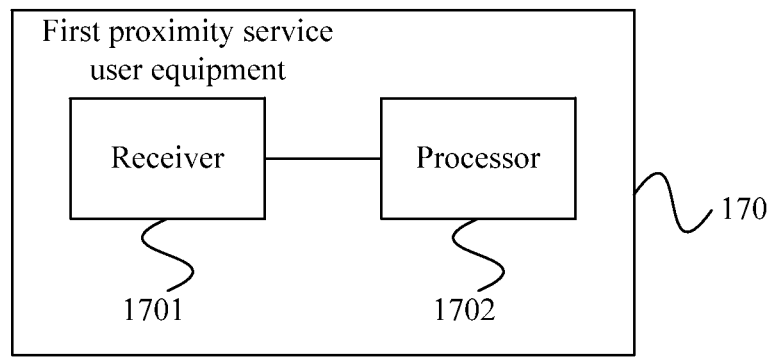
FIG. 17 is a schematic structural diagram of a first ProSe user equipment according to a fifth embodiment of the present invention.

FIG. 17 is a schematic diagram of a first ProSe user equipment according to a fifth embodiment of the present invention. As shown in FIG. 17, a first ProSe user equipment 170 provided by this embodiment includes a receiver 1701 and a processor 1702.

The receiver 1701 is configured to receive a third indication message broadcasted by a base station, where the third indication message indicates a device identifier list of a ProSe user equipment and a service identifier of the ProSe user equipment, a device identifier in the device identifier list and the service identifier have a correspondence, and the ProSe user equipment includes the first ProSe user equipment and a second ProSe user equipment, or the ProSe user equipment includes a second ProSe user equipment.

The processor 1702 is configured to perform a ProSe with the second ProSe user equipment according to the device identifier list and the service identifier that are indicated by the third indication message.

The first ProSe user equipment according to this embodiment may be used to implement a technical solution of the foregoing method embodiments; the implementation principle and technical effects thereof are similar and are not repeatedly described herein.

Figure 18:
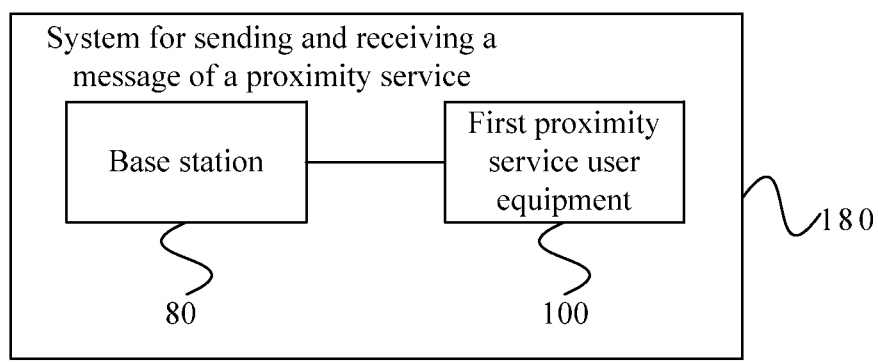
FIG. 18 is a schematic structural diagram of a system for sending and receiving a message for a ProSe according to a first embodiment of the present invention.

FIG. 18 is a schematic structural diagram of a system for sending and receiving a message for a ProSe 180 according to a first embodiment of the present invention. As shown in FIG. 18, a system 180 for sending and receiving a message for a ProSe provided by this embodiment of the present invention includes the base station 80 and the first ProSe user equipment 100.

The system for sending and receiving a message for a ProSe according to this embodiment may be used to implement a technical solution of the foregoing method embodiments; the implementation principle and technical effects thereof are similar and are not repeatedly described herein.

Figure 19:
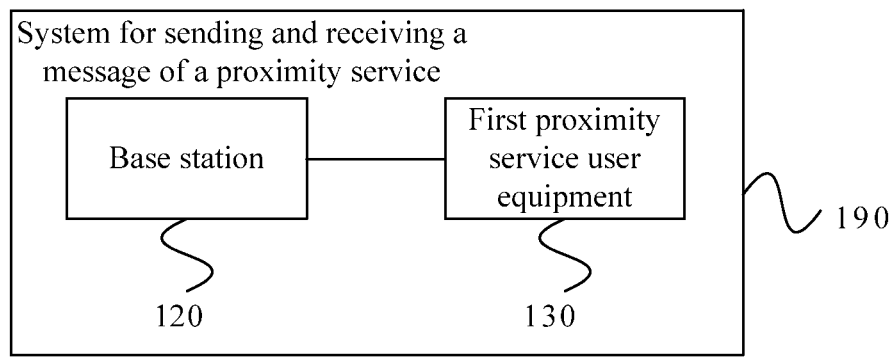
FIG. 19 is a schematic structural diagram of a system for sending and receiving a message for a ProSe according to a second embodiment of the present invention.

FIG. 19 is a schematic structural diagram of a system for sending and receiving a message for a ProSe 190 according to a second embodiment of the present invention. As shown in FIG. 19, a system for sending and receiving a message for a ProSe provided by this embodiment of the present invention includes the base station 120 and the first ProSe user equipment 130.

The system for sending and receiving a message for a ProSe according to this embodiment may be used to implement a technical solution of the foregoing method embodiments; the implementation principle and technical effects thereof are similar and are not repeatedly described herein.

In the several embodiments provided in the present application, it should be understood that the disclosed apparatus and method may be implemented in other manners. For example, the described apparatus embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network units. A part or all of the modules may be selected according to actual needs to achieve the objectives of the solutions of the embodiments.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for sending a message for a proximity service (ProSe) comprising:
    collecting, by a base station, a first device identifier and a first resource parameter of a first ProSe user equipment in a first discovery signal for being discovered in a Device to Device (D2D) communication link, wherein the first discovery signal is sent by the first ProSe user equipment using the first resource parameter;

collecting, by the base station, a second device identifier and a second resource parameter of a second ProSe user equipment in a second discovery signal for being discovered in the D2D communication link, wherein the second discovery signal sent is by the second ProSe user equipment using the second resource parameter; and broadcasting, by the base station, an indication message that indicates a device identifier list and a resource parameter list before the first ProSe user equipment and the second ProSe user equipment sense existence of each other, wherein the device identifier list comprises the first device identifier and the second device identifier, wherein the resource parameter list comprises the first resource parameter and the second resource parameter, and wherein the device identifier list is mapped to the resource parameter list.

2. The method according to claim 1, further comprising collecting, by the base station, a first service identifier of the first ProSe user equipment and a second service identifier of the second ProSe user equipment, wherein the first service identifier corresponds to the first device identifier, wherein the second service identifier corresponds to the second device identifier, and wherein the indication message further indicates the first service identifier and the second service identifier.

3. The method according to claim 1, wherein at least one of the first resource parameter and the second resource parameter are determined based on at least one of a time-domain resource parameter, a frequency-domain resource parameter, and a code-word resource parameter.

4. A base station, comprising:
a processor configured to
collect a first device identifier and a first resource parameter of a first ProSe user equipment in a first discovery signal for being discovered in a Device to Device (D2D) communication link, wherein the first discovery signal is sent by the first ProSe user equipment using the first resource parameter;

collect a second device identifier and a second resource parameter of a second ProSe user equipment in a second discovery signal for being discovered in the D2D communication link, wherein the second discovery signal is sent by the second ProSe user equipment using the second resource parameter; and generate an indication message indicating a device identifier list and a resource parameter list before the first ProSe user equipment and the second ProSe user equipment sense existence of each other, wherein the device identifier list comprises the first device identifier and the second device identifier, wherein the resource parameter list comprises the first resource parameter and the second resource parameter, and wherein the device identifier list is mapped to the resource parameter list; and a transmitter coupled to the processor and configured to broadcast the indication message.

5. The base station according to claim 4, wherein the processor is further configured to collect a first service identifier of the first ProSe user equipment and a second service identifier of the second ProSe user equipment, wherein the first service identifier corresponds to the first device identifier, wherein the second service identifier corresponds to the second device identifier, and wherein the indication message further indicates the first service identifier and the second service identifier.

6. The method according to claim 4, wherein at least one of the first resource parameter and the second resource parameter are determined based on at least one of a time-domain resource parameter, a frequency-domain resource parameter, and a code-word resource parameter.

* * * * *